US009613612B2

(12) United States Patent
Perkmann et al.

(10) Patent No.: US 9,613,612 B2
(45) Date of Patent: Apr. 4, 2017

(54) NOISE REDUCING SOUND REPRODUCTION SYSTEM

(75) Inventors: Michael Perkmann, Vienna (AT); Peter Tiefenthaler, Vienna (AT)

(73) Assignee: AKG Acoustics GmbH, Vienna (AT)

( * ) Notice: Subject to any disclaimer, the term of this patent is extended or adjusted under 35 U.S.C. 154(b) by 618 days.

(21) Appl. No.: 13/557,869

(22) Filed: Jul. 25, 2012

(65) Prior Publication Data

US 2013/0028440 A1 Jan. 31, 2013

(30) Foreign Application Priority Data

Jul. 26, 2011 (EP) .................................... 11175347

(51) Int. Cl.
*H04B 15/00* (2006.01)
*G10K 11/178* (2006.01)

(52) U.S. Cl.
CPC .................................. *G10K 11/178* (2013.01)

(58) Field of Classification Search
CPC .............. G10K 11/178; G10L 21/2028; G10L 2021/02165; H04R 3/005; H04R 2410/07
See application file for complete search history.

(56) References Cited

U.S. PATENT DOCUMENTS 3,715,500 A * 2/1973 Sessler et al. ................ 381/191
5,361,381 A * 11/1994 Short .............................. 381/80
5,526,347 A * 6/1996 Chen ........................ H04B 3/23 370/290
6,212,273 B1 * 4/2001 Hemkumar et al. ...... 379/406.08
6,983,654 B2 * 1/2006 Balin et al. ................. 73/290 V
7,451,079 B2 * 11/2008 Oudeyer ........................ 704/205
8,223,986 B2 * 7/2012 Sander et al. .................. 381/74
8,515,089 B2 * 8/2013 Nicholson .................... 381/71.6
2004/0252846 A1 12/2004 Nonaka et al. .............. 381/71.4
2009/0097669 A1 * 4/2009 Kamiya ............... G10K 11/178 381/71.4

(Continued)

FOREIGN PATENT DOCUMENTS

EP 1 947 642 A1 7/2008 ........... G10K 11/178
JP 6 308976 11/1994 ............. G10K 11/16
JP 2009 045955 3/2009 ........... G10K 11/178

OTHER PUBLICATIONS

European Search Report, EP 11 175 347.1-1240, dated Jul. 20, 2012, 7 pgs.

(Continued)

*Primary Examiner* — Simon Sing
(74) *Attorney, Agent, or Firm* — McCoy Russell LLP

(57) ABSTRACT

A noise reducing sound reproduction system and method is disclosed, in which an input signal is supplied to a loudspeaker by which it is acoustically radiated. The signal radiated by the loudspeaker is received by a microphone that is acoustically coupled to the loudspeaker via a secondary path and that provides a microphone output signal. The microphone output signal may be subtracted from a useful-signal to generate a filter input signal. The filter input signal may be filtered in an active noise reduction filter to generate an error signal. The useful-signal may be subtracted from the error signal to generate the loudspeaker input signal, and the useful-signal may be filtered by one or more low-pass filters prior to subtraction from the microphone output signal.

23 Claims, 5 Drawing Sheets

(56) References Cited

U.S. PATENT DOCUMENTS

| | | | | |
|---|---|---|---|---|
| 2009/0220101 | A1 | 9/2009 | Bachmann | 381/71.1 |
| 2010/0266134 | A1* | 10/2010 | Wertz | G10K 11/178 381/71.1 |
| 2010/0284458 | A1* | 11/2010 | Andersson et al. | 375/240.03 |
| 2010/0329473 | A1 | 12/2010 | Rauhala | 381/71.1 |

OTHER PUBLICATIONS

Woon S. Gan et al., "An Integrated Audio and Active Noise Control Headsets," IEEE Transactions on Consumer Electronics, vol. 48, No. 2, May 2002, 6 pgs.
Sen M. Kuo et al., "Active Noise Control: A Tutorial Review," Proceedings of the IEEE, vol. 87, No. 6, Jun. 1999, 32 pgs.
Colin H., Hansen et al., "Active Control of Noise and Vibration," E&FN Spon, Foundary Row, London, 1997, 20 pgs.
U.S. Appl. No. 13/559,093, filed Jul. 26, 2012.

* cited by examiner

NOISE REDUCING SOUND REPRODUCTION SYSTEM

BACKGROUND OF THE INVENTION

1. Priority Claim

This application claims the benefit of priority from European Patent Application No. 11 175347.1-1240, filed Jul. 26, 2011, which is incorporated by reference.

2. Field

This invention relates to a noise reducing sound reproduction system and, in particular, a noise reduction system which includes an earphone for allowing a user to enjoy, for example, reproduced music or the like, with reduced ambient noise.

3. Related Art

In active noise reduction systems, also known as active noise cancellation/control (ANC) systems, the same loudspeakers, in particular loudspeakers arranged in the two earphones of headphones, are often used for both noise reduction and reproduction of desirable sound such as music or speech. However, there is a significant difference between the sound impression created by employing active noise reduction and the impression created by not employing active noise reduction, due to the fact that noise reduction systems reduce the desirable sound to a certain degree, as well as the noise. Accordingly, the listener has to accept sound impressions that differ, depending on whether noise reduction is on or off. Therefore, there is a general need for an improved noise reduction system to overcome this drawback.

SUMMARY

In a first aspect, a noise reducing sound reproduction system may include: a loudspeaker that is connected to a loudspeaker input path, and a microphone that is acoustically coupled to the loudspeaker via a secondary path. The microphone may also be connected to a microphone output path. The noise reproducing sound system may also include a first subtractor that is connected downstream of the microphone output path and also connected to a first useful-signal path, an active noise reduction filter that is connected downstream of the first subtractor, and a second subtractor that is connected between the active noise reduction filter and the loudspeaker input path and also to a second useful-signal path. Both useful-signal paths may be supplied with a useful signal to be reproduced, and the second useful-signal path comprises one or more low-pass filters.

In a second aspect, a noise reducing sound reproduction method is disclosed, in which, an input signal is supplied to a loudspeaker by which it is acoustically radiated, the signal radiated by the loudspeaker is received by a microphone that is acoustically coupled to the loudspeaker via a secondary path and that provides a microphone output signal. The microphone output signal may be subtracted from a useful-signal to generate a filter input signal. The filter input signal may be filtered in an active noise reduction filter to generate an error signal, and the useful-signal may be subtracted from the error signal to generate the loudspeaker input signal. The useful-signal may be filtered by one or more low-pass filters prior to subtraction from the microphone output signal.

BRIEF DESCRIPTION OF THE DRAWINGS

Various specific embodiments are described in more detail below based on the exemplary embodiments shown in the figures of the drawing. Unless stated otherwise, similar or identical components are labeled in all of the figures with the same reference numbers.

DETAILED DESCRIPTION

Figure 1:
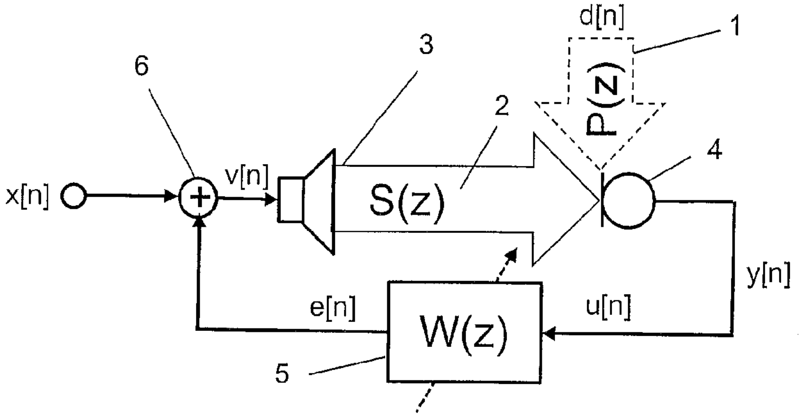
FIG. 1 is a block diagram of an example feedback type active noise reduction system in which the useful signal is supplied to the loudspeaker signal path.

Feedback ANC systems can reduce or even cancel a disturbing signal, such as a noise signal, by providing at a listening site, or in a listening space, a noise reducing signal that ideally has the same amplitude over time but the opposite phase compared to the noise signal. By superimposing the noise signal and the noise reducing signal the resulting signal, also known as error signal, ideally tends toward zero decibels (dB), or at least to the point where it is not discernible by a human listener. The quality of the noise reduction depends on the quality of a secondary path, such as the acoustic path between a loudspeaker and a microphone, which can represent the listener's ear. The quality of the noise reduction further depends on the quality of a ANC filter that is connected between the microphone and the loudspeaker. The ANC filter may filter the error signal provided by the microphone such that, when the filtered error signal is reproduced by the loudspeaker, it further reduces the error signal. However, problems can occur such as when in addition to the filtered error signal, a useful signal such as music or speech is provided at the listening site. The useful signal may, for example, be provided by the loudspeaker that also reproduces the filtered error signal. In this situation, the useful signal may be deteriorated by the system, as previously mentioned.

For the sake of simplicity, no distinction is made herein between electrical and acoustic signals. However, all signals provided by the loudspeaker or received by the microphone are actually audible sound of an acoustic nature. All other signals are electrical in nature. The loudspeaker and the microphone may be part of an acoustic sub-system (e.g., a loudspeaker-room-microphone system) having an input stage formed by a loudspeaker and an output stage formed by a microphone. The sub-system may be supplied with an electrical input signal and providing an electrical output signal. As used herein, the term "Path" means an electrical or acoustical connection that may include further elements such as signal conducting means, amplifiers, filters, and any other signal conveyance. As used herein, the terms "spectrum shaping filter" is a filter in which the spectra of the input and output signal are different over a predetermined range of frequency.

As described herein, the components of the example feedback type active noise reduction systems may be electrical circuits operable in the analog domain and in communication to process signals, digital devices operable in the digital domain and in communication to process signals, or a combination of cooperatively operating analog and digital devices. Analog devices may include hardware such as various resistors, capacitors, inductors, diodes, transistors, and other electrical circuit components, including but not limited to logic circuits, gates, circuit boards, and the like. Digital devices may include a processor, such as a microprocessor, a digital signal processor, a field programmable gate array, and/or any other computing or logic device or system capable of executing instructions. Digital devices may also include one or more memory devices configured to store instructions and data. The instructions are executable by the processor to provide the functionality of the system and/or to direct, and/or control for performance analog and/or digital devices included in the system. The memory may include, but is not limited to any form of non-transitory computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like.

Reference is now made to FIG. 1, which is a block diagram illustrating an example feedback type active noise reduction (ANC) system in which a disturbing signal d[n], also referred to as noise signal, is transferred (radiated) to a listening site, such as a listener's ear, via a primary path 1. The primary path 1 has a transfer characteristic of P(z). Additionally, an input signal v[n] is acoustically transferred (radiated) from a loudspeaker 3 to the listening site via a secondary path 2. The secondary path 2 has a transfer characteristic of S(z). A microphone 4 positioned at the listening site receives the signals that arise from the loudspeaker 3 and the disturbing signal d[n]. The microphone 4 provides a microphone output signal y[n] that represents the sum of these received signals. The microphone output signal y[n] is supplied as filter input signal u[n] to an ANC filter 5 that outputs to an adder 6 an error signal e[n]. The ANC filter 5 which may be an adaptive filter has a transfer characteristic of W(z). The adder 6 also receives an optionally pre-filtered, such as with a spectrum shaping filter (not shown in the drawings) useful signal x[n] such as music or speech and provides an input signal v[n] to the loudspeaker 3.

The signals x[n], y[n], e[n], u[n] and v[n] can be provided in the discrete time domain, for example. In other examples, one or more of the signals x[n], y[n], e[n], u[n] and v[n] may be in the frequency domain. For the following considerations their spectral representations X(z), Y(z), E(z), U(z) and V(z) are used. The differential equations describing the system illustrated in FIG. 1 are as follows:

$$Y(z)=S(z)\cdot V(z)=S(z)\cdot(E(z)+X(z)) \quad (1)$$

$$E(z)=W(z)\cdot U(z)=W(z)\cdot Y(z) \quad (2)$$

In the system of FIG. 1, the useful signal transfer characteristic M(z)=Y(z)/X(z) is thus $$M(z)=S(z)/(1-W(z)\cdot S(z)) \quad (3)$$

Assuming W(z)=1 then $$\lim[S(z)\to 1]M(z)\Rightarrow M(z)\to\infty \quad (4)$$

$$\lim[S(z)\to\pm\infty]M(z)\Rightarrow M(z)\to 1 \quad (5)$$

$$\lim[S(z)\to 0]M(z)\Rightarrow S(z) \quad (6)$$

Assuming W(z)=∞ then $$\lim[S(z)\to 1]M(z)\Rightarrow M(z)\to 0. \quad (7)$$

As can be seen from equations (4)-(7), the useful signal transfer characteristic M(z) approaches 0 when the transfer characteristic W(z) of the ANC filter 5 increases, while the secondary path transfer function S(z) remains neutral, i.e. at levels around 1 or 0[dB]. For this reason, the useful signal x[n] can be adapted accordingly to ensure that the useful signal x[n] is comprehended substantially identically by a listener when ANC processing is on or off. Furthermore, the useful signal transfer characteristic M(z) can also depend on the transfer characteristic S(z) of the secondary path 2 to the effect that the adaption of the useful signal x[n] also depends on the transfer characteristic S(z) and its fluctuations due to aging, temperature, change of listener etc. so that a certain difference between "on" and "off" of the ANC system could be apparent.

Figure 2:
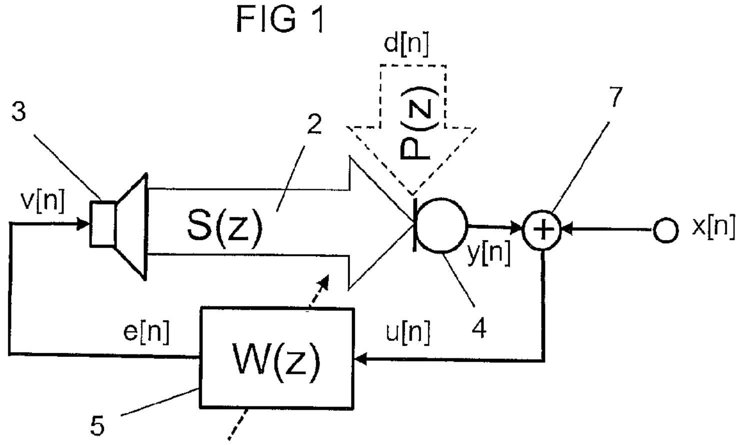
FIG. 2 is a block diagram of an example feedback type active noise reduction system in which the useful signal is supplied to the microphone signal path.

While in the system of FIG. 1 the useful signal x[n] is supplied to the acoustic sub-system (loudspeaker, room, microphone) at the adder 6, connected to loudspeaker 3, in the system of FIG. 2 the useful signal x[n] is supplied at the microphone 4. Therefore, in the system of FIG. 2, the adder 6 is omitted and an adder 7 is arranged downstream of microphone 4 to sum up the useful signal x[n] and the microphone output signal y[n]. The signal x[n] may be pre-filtered, as previously discussed. Accordingly, the loudspeaker input signal v[n] is the error signal [e], such that v[n]=[e], and the filter input signal u[n] is the sum of the useful signal x[n] and the microphone output signal y[n], i.e., u[n]=x[n]+y[n].

The differential equations describing the system illustrated in FIG. 2 are as follows:

$$Y(z)=S(z)\cdot V(z)=S(z)\cdot E(z) \quad (8)$$

$$E(z)=W(z)\cdot U(z)=W(z)\cdot(X(z)+Y(z)) \quad (9)$$

The useful signal transfer characteristic M(z) in the system of FIG. 2 without considering the disturbing signal d[n] is thus $$M(z)=(W(z)\cdot S(z))/(1-W(z)\cdot S(z)) \quad (10)$$

$$\lim[(W(z)\cdot S(z))\to 1]M(z)\Rightarrow M(z)\to\infty \quad (11)$$

$$lim[(W(z)\cdot S(z))\rightarrow 0]M(z)\Rightarrow M(z)\rightarrow 0 \quad (12)$$

$$lim[(W(z)\cdot S(z))\rightarrow \pm\infty]M(z)\Rightarrow M(z)\rightarrow 1. \quad (13)$$

As can be seen from equations (11)-(13), the useful signal transfer characteristic M(z) approaches 1 when the open loop transfer characteristic (W(z)·S(z)) increases or decreases and approaches 0 when the open loop transfer characteristic (W(z)·S(z)) approaches zero. For this reason, the useful signal x[n] can be adapted additionally in higher spectral ranges to ensure that the useful signal x[n] is comprehended substantially identically by a listener when ANC is on or off. Compensation in higher spectral ranges can be quite difficult so that a certain difference between "on" and "off" may be apparent. On the other hand, the useful signal transfer characteristic M(z) does not depend on the transfer characteristic S(z) of the secondary path 2 and its fluctuations due to aging, temperature, change of listener and other parameters affecting the transfer characteristic S(z).

Figure 3:
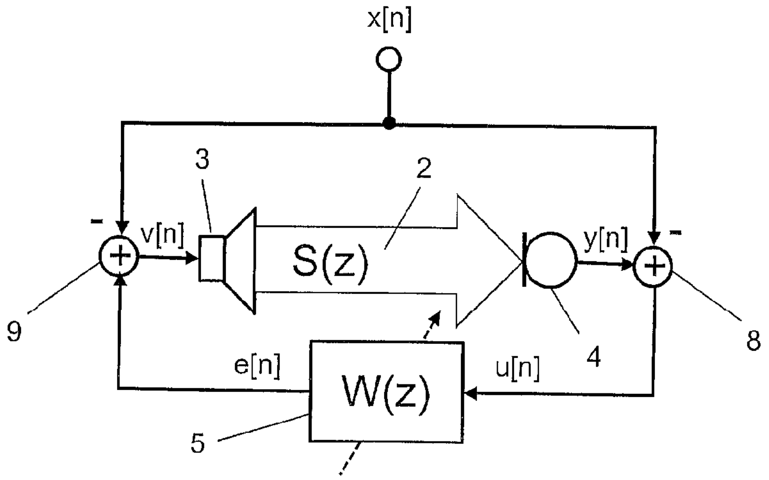
FIG. 3 is a block diagram of an example feedback type active noise reduction system in which the useful signal is supplied to the loudspeaker and microphone signal paths.

FIG. 3 is a block diagram illustrating an example feedback type active noise reduction system in which the useful signal is supplied to both, the loudspeaker path and the microphone path. For the sake of simplicity, the primary path 1 is omitted from FIG. 3, notwithstanding that noise (disturbing signal d[n]) is still present. In particular, the system of FIG. 3 is based on the system of FIG. 1, however, with an additional subtractor 8 that subtracts the useful signal x[n] from the microphone output signal y[n] to form the ANC filter input signal u[n] and with a subtractor 9 that substitutes adder 6 (FIG. 1) and subtracts the useful signal x[n] from error signal e[n] to generate a loudspeaker input signal v[n].

The differential equations describing the system illustrated in FIG. 3 are as follows:

$$Y(z)=S(z)\cdot V(z)=S(z)\cdot(E(z)-X(z)) \quad (14)$$

$$E(z)=W(z)\cdot U(z)=W(z)\cdot(Y(z)-X(z)) \quad (15)$$

The useful signal transfer characteristic M(z) in the system of FIG. 3 is thus $$M(z)=(S(z)-W(z)\cdot S(z))/(1-W(z)\cdot S(z)) \quad (16)$$

$$lim[(W(z)\cdot S(z))\rightarrow 1]M(z)\Rightarrow M(z)\rightarrow\infty \quad (17)$$

$$lim[(W(z)\cdot S(z))\rightarrow 0]M(z)\Rightarrow M(z)\rightarrow S(z) \quad (18)$$

$$lim[(W(z)\cdot S(z))\rightarrow\pm\infty]M(z)\Rightarrow M(z)\rightarrow 1. \quad (19)$$

It can be seen from equations (17)-(19) that the behavior of the system of FIG. 3 is similar to that of the system of FIG. 2. One difference is that the useful signal transfer characteristic M(z) approaches S(z) when the open loop transfer characteristic (W(z)·S(z)) approaches 0. Like the system of FIG. 1, the system of FIG. 3 depends on the transfer characteristic S(z) of the secondary path 2 and its fluctuations due to aging, temperature, change of listener, and other parameters affecting the transfer characteristic S(z).

Figure 4:
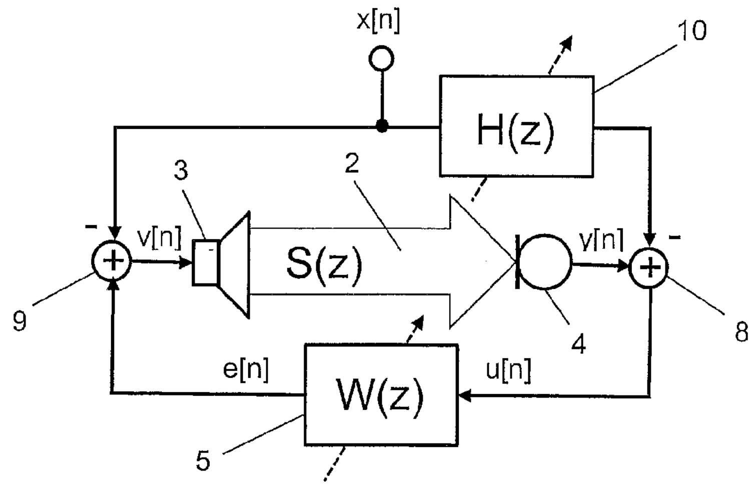
FIG. 4 is a block diagram of an example of the active noise reduction system of FIG. 3, in which the useful signal is supplied via a low pass filter in the microphone path.

In FIG. 4, a system is shown that is based on the system of FIG. 3 and that additionally includes an electrical low-pass filter 10 connected upstream of the subtractor 8 in order to filter the useful signal x[n] with the low-pass transfer function H(z). The low-pass transfer function H(z) may represent an approximation of the physical path S(z).

The differential equations describing the system illustrated in FIG. 4 are as follows:

$$Y(z)=S(z)\cdot V(z)=S(z)\cdot(E(z)-X(z)) \quad (20)$$

$$E(z)=W(z)\cdot U(z)=W(z)\cdot(Y(z)-H(z)\cdot X(z)) \quad (21)$$

Assuming that H(z)≈S(z) then $$E(z)=W(z)\cdot U(z)\approx W(z)\cdot(Y(z)-S(z)\cdot X(z)) \quad (22)$$

The useful signal transfer characteristic M(z) in the system of FIG. 4 is thus $$M(z)\approx S(z)\cdot(1+W(z)\cdot S(z))/(1+W(z)\cdot S(z))\approx S(z) \quad (23)$$

From equation (23) it can be seen that the useful signal transfer characteristic M(z) approximates the secondary path transfer characteristic S(Z) when the ANC system is active. When the ANC system is not active, the useful signal transfer characteristic M(z) is identical with the secondary path transfer characteristic S(Z). Thus, the aural impression of the useful signal for a listener at a location close to the microphone 4 is similar regardless of whether the noise reduction is active or not.

The ANC filter 5 and the low-pass filter 10 may be fixed filters with a constant transfer characteristic or adaptive filters with a controllable transfer characteristic. In the drawings, the adaptive structure of filters per se is indicated by an arrow underlying the respective block and the optionality of the adaptive structure is indicated by a broken line.

Figure 5:
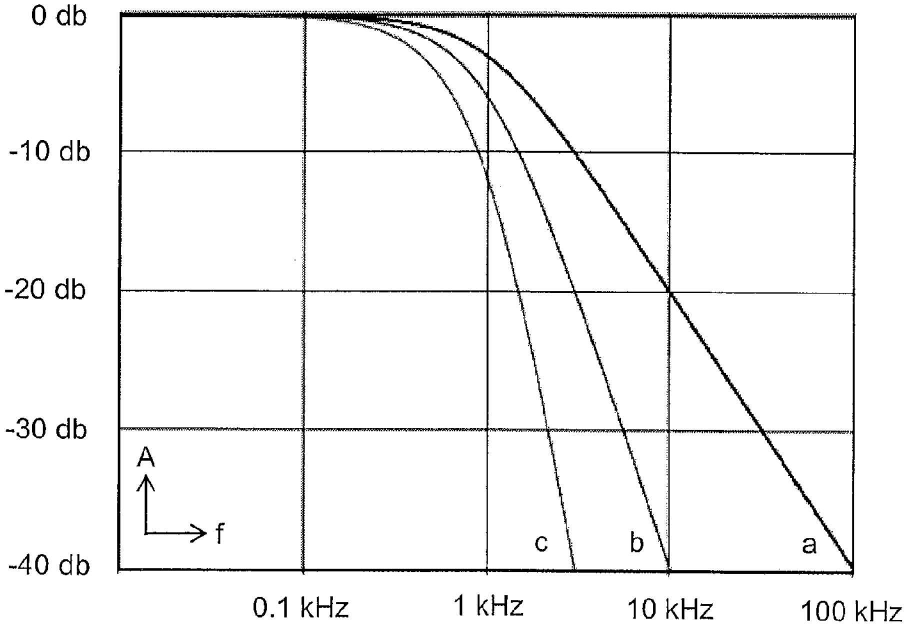
FIG. 5 is a magnitude frequency response diagram representing an example of transfer characteristics of low pass filters applicable in the system of FIG. 4.

FIG. 5 is a magnitude frequency response diagram representing the transfer characteristics a, b, c of three different low pass filters applicable in the system of FIG. 4, that have different cutoff frequencies in a predetermined range such as from 0.1 Hz up to 1 kHz and different filter orders, resulting in different slopes, such as 6 dB/octave (a), 12 dB/octave (b) and 24 dB/octave (c). A low-pass filter is a filter that passes low-frequency signals but attenuates (reduces the amplitude A [dB] of) signals with frequencies f [kHz] higher than the cutoff frequency. The actual amount of attenuation for each frequency can vary from filter to filter.

The system shown in FIG. 4 is, for example, applicable in headphones in which useful signals, such as music or speech, are reproduced under different conditions in terms of noise and the listener may appreciate being able to switch off the ANC system, in particular when no noise is present, without experiencing any audible differences between the active and non-active state of the ANC system. However, the systems presented herein are not applicable in headphones only, but also in all other fields in which occasional noise reduction is desired.

Figure 6:
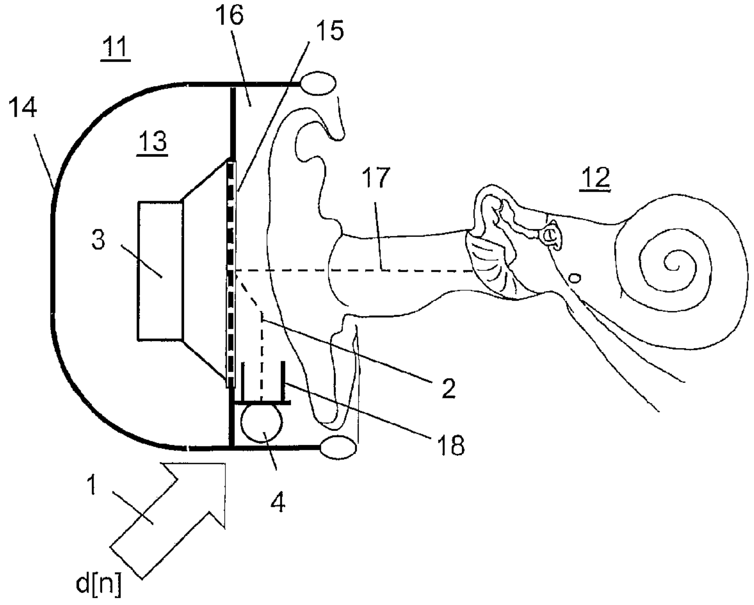
FIG. 6 is a schematic diagram of an example earphone applicable in connection with the active noise reduction system of FIG. 4, in which the microphone is arranged in front of the loudspeaker and equipped with an acoustic low pass filter.

FIG. 6 illustrates an exemplary earphone 11 that may be applied with the present active noise reduction systems. The earphone 11 may be, together with another identical earphone, part of a headphone (not shown) and may be acoustically coupled to a listener's ear 12. In the present example, the ear 12 is exposed via the primary path 1 to the disturbing signal d[n], such as ambient noise. The earphone 11 comprises a cup-like housing 14 with an aperture 15 that may be covered by a sound permeable cover, such as a grill, a grid or any other sound permeable structure or material. The loudspeaker 3 radiates sound to the ear 12. The loudspeaker 3 is arranged at the aperture 15 of the housing 14, and is positioned within an earphone cavity 13 formed by the housing 14. The cavity 13 may be airtight or vented by any means, such as by means of a port, vent, opening, or other mechanisms allowing a flow of air between the cavity 13 and external to the housing 14. The microphone 4 is positioned in front of the loudspeaker 3. An acoustic path 17 extends from the speaker 3 to the ear 12 and has a transfer characteristic which is approximated for noise control purposes by the transfer characteristic of the secondary path 2 which extends from the loudspeaker 3 to the microphone 4. The microphone 4 may be equipped with an acoustic low-pass filter 18. In the present example, the acoustic low-pass filter 18 is a (sound guiding) tube-like duct attached to the microphone 4; the microphone 4 being arranged in front of the loudspeaker 3. The acoustic low pass filter 18 may operate with a cutoff frequency of 1 kHz or less.

In mobile devices such as headphones, the space and energy available for the ANC system is quite limited. Digital circuitry may be too space and energy consuming, and in mobile devices analog circuitry can be preferred in the design of ANC systems. However, analog circuitry only allows for a very limited complexity of the ANC system and thus correctly model the secondary path solely by analog means can be difficult. In particular, analog filters used in an ANC system are often fixed filters or very simple adaptive filters because they are easy to build, have low energy consumption and require little space.

The system illustrated above with reference to FIG. 4 can provide good results when employing fixed analog filters since there is a minor dependency on the secondary path behavior. Furthermore, the system allows for a good estimation of the transfer characteristic of the low-pass filter 10 based on the ANC filter transfer characteristic W(z) as well as on the secondary path filter characteristic S(z). The ANC filter transfer characteristic W(z) and the secondary path filter characteristic S(z) form the open loop characteristic W(z)·S(z), which, in principal, has only minor fluctuations, and can be based on the assessment of the acoustic properties of the headphone when attached to a listener's head.

The ANC filter 5 can have a transfer characteristic that tends to have lower gain at lower frequencies with an increasing gain over frequency to a maximum gain followed by a decrease of gain over frequency down to loop gain. With high gain of the ANC filter 5, the loop inherent in the ANC system can keep the system linear in a predetermined frequency range, such as below 1 kHz and, thus, can render any additional filtering redundant in the predetermined frequency range.

Figure 7:
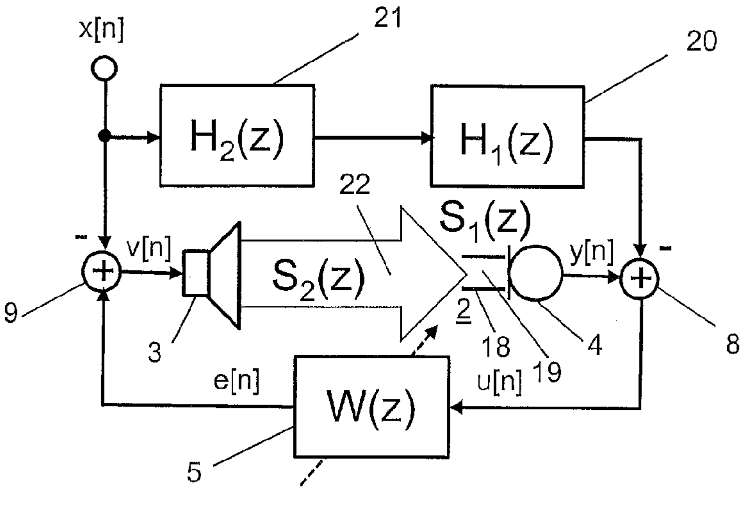
FIG. 7 is a block diagram of another example active noise reduction system, in which the microphone is equipped with an acoustic low pass filter and the useful signal is supplied via at least two low pass filters to the microphone path.

Referring to FIG. 7, an example of at least two separate filters may be used for low-pass filtering. FIG. 7 shows an exemplary ANC system that, compared to the system of FIG. 4, employs (at least) two low-pass filters 20 and 21 (sub-filters) instead of the single electrical low-pass filter 10 (FIG. 4). In addition, in FIG. 7, the acoustic low-pass filter 18 (FIG. 6) is employed and forms a path 19 that has a transfer characteristic $S_1(z)$. Accordingly, the secondary path 2 from the loudspeaker 3 to the microphone 4 has the transfer characteristic $S(z)=S_1(z)\cdot S_2(z)$, in which $S_2(z)$ is the transfer characteristic of the secondary path 22 from the loudspeaker 3 to the acoustic low-pass filter 18. One of the electrical filters (e.g., low-pass filter 20 having the transfer characteristic $H_1(z)$) may approximate the transfer characteristic $S_1(z)$ and the other one of the electrical filters (e.g., low-pass filter 21 having a transfer characteristic $H_2(z)$) may approximate the transfer characteristic $S_2(z)$. The number of filters used may also depend on many other aspects such as costs, noise behavior of the filters, acoustic properties of the headphone, delay time of the system, physical space available for implementing the system, and/or any other parameter effecting operation of the ANC system.

Figure 8:
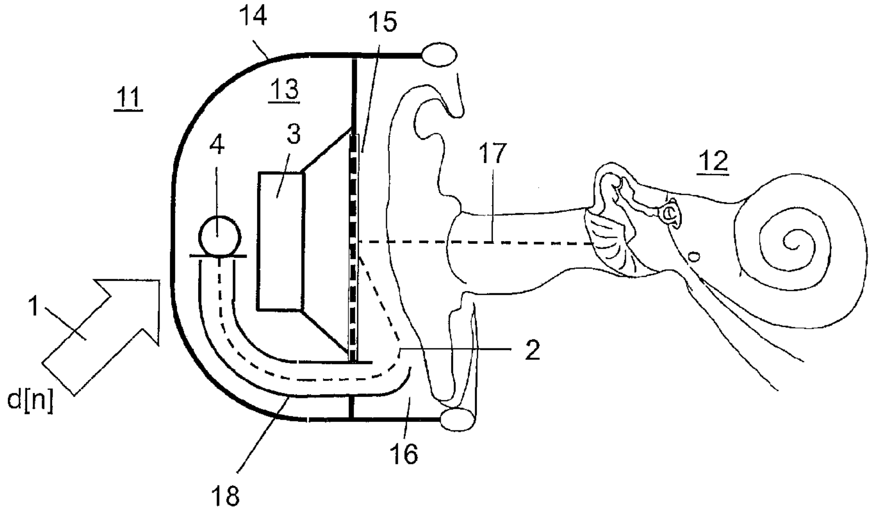
FIG. 8 is a schematic diagram of another example earphone, in which the microphone is arranged at the rear of the loudspeaker and equipped with an acoustic low pass filter.
Figure 9:
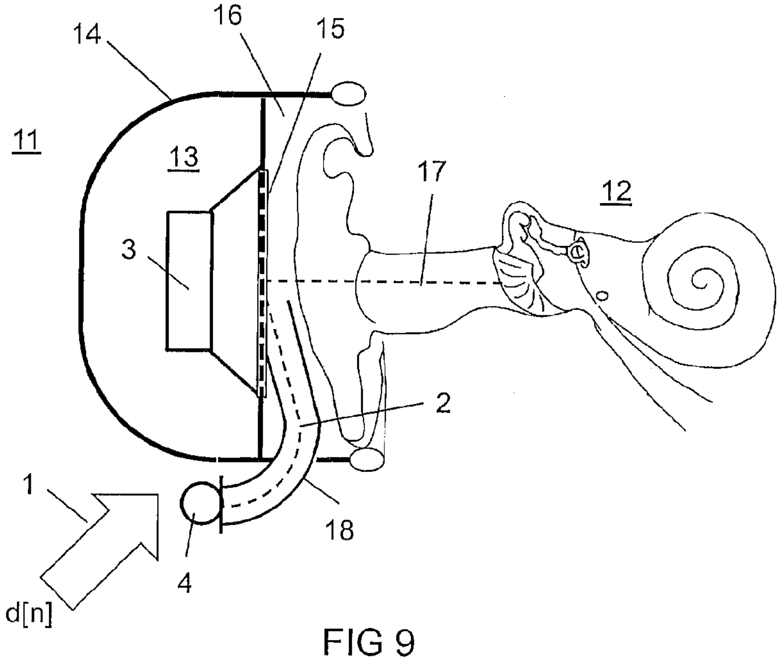
FIG. 9 is a schematic diagram of another example earphone, in which the microphone is arranged to the side of the loudspeaker and equipped with an acoustic low pass filter.
Figure 10:
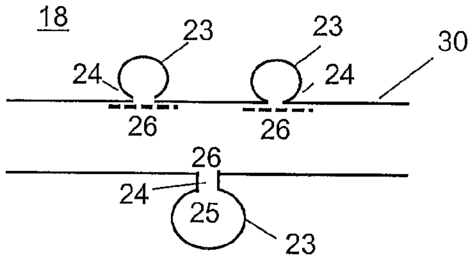
FIG. 10 is a schematic diagram of an example acoustic low pass filter formed by a tube-like duct that may include Helmholtz resonators.

FIGS. 8 and 9 show variations of the earphone 11 of FIG. 6 in which the microphone 4 is arranged either at the rear of or alongside the loudspeaker 3 depending on, for example, the dimensions of the acoustic filter 18.

A tube-like duct 30 may be a passageway for acoustic sound forming the basis of the acoustic filter 18 and may include additional means that further influence the acoustic behavior of the duct as illustrated with reference to FIGS. 10-14. According to FIG. 10, the acoustic filter 18 may include Helmholtz resonators. A Helmholtz resonator typically includes an air mass enclosing cavity, or chamber, and a venting opening or tube, such as a port or neck that connects the air mass in the cavity to the outside, in this case the passageway of the duct 30. Helmholtz resonance is the phenomenon of air resonance in a cavity. When air is forced into a cavity, the pressure inside the cavity increases. When the external force pushing the air into the cavity is removed, the higher-pressure air inside the cavity will flow out. However, this surge of air flowing out will tend to overcompensate the lower outside air pressure, due to the inertia of the air in the neck, and the cavity will be left with a pressure slightly lower than that of the outside, causing air to be drawn back in. This process repeats itself with the magnitude of the pressure changes decreasing each time. The air in the port or neck has mass. Since it is in motion, it possesses some momentum.

A longer port would make for a larger mass. The diameter of the port affects the mass of air in the chamber. A port that is too small in area for the chamber volume will "choke" the flow while one that is too large in area for the chamber volume tends to reduce the momentum of the air in the port. In the present example, a predetermined number, such as three resonators 23 are employed, each having a neck 24 and a chamber 25. The duct includes openings 26 where the necks 24 are attached to the duct 30 to allow the air to flow from the inside of the duct 30 into the chamber 25, and back into the duct.

Figure 11:
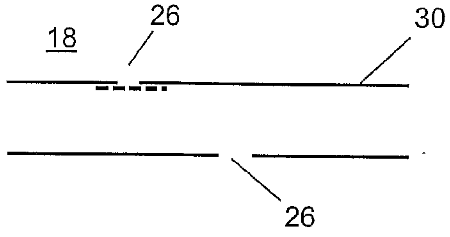
FIG. 11 is a schematic diagram of another example tube-like duct that has openings.
Figure 12:
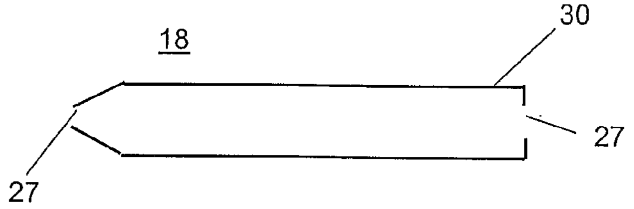
FIG. 12 is a schematic diagram of another example tube-like duct that has semi-closed ends.
Figure 13:
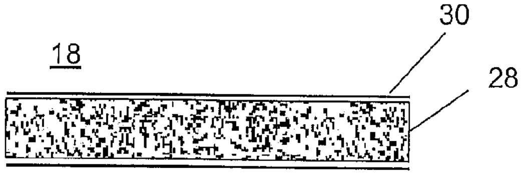
FIG. 13 is a schematic diagram of another example tube-like duct filled with sound-absorbing material.
Figure 14:
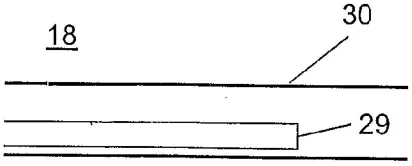
FIG. 14 is a schematic diagram of another example tube-like duct that has a tube-in-tube structure.

In the example of an acoustic filter 18 shown in FIG. 11, the exemplary duct 30 has the openings 26 only, without the resonators 23 and the necks 24. The openings 26 in the ducts 30 shown in FIGS. 10 and 11 may be covered by a sound-permeable membrane (indicated by a broken line) to allow further sound tuning. The exemplary duct 30 as illustrated with reference to FIG. 12 has cross-section reducing tapers 27, such as positioned at both its ends (or anywhere in between). The tapers 27 may have different shapes. In the acoustic filter shown in FIG. 13, the duct 30 is filled with sound absorbing material 28 such as rock wool, sponge, foam or any other form of material capable of absorbing sound. In other examples, the absorbing material may be used as an acoustic filter without the duct 30 by being positioned between the microphone 4 and the loudspeaker 3. According to FIG. 14, an example tube-in-tube structure may be employed with another tube 29 being arranged in the duct 30. In this example the tube 29 may be closed at one end and may have a predetermined diameter and length which are smaller than the diameter and length of the tube forming duct 30. The tube 29 forms a Helmholtz resonator within the duct 30.

Although various examples of realizing the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

We claim:

1. A noise reducing sound reproduction system comprising:

a loudspeaker that is connected to a loudspeaker input path;

a microphone that is acoustically coupled to the loudspeaker via a secondary path and connected to a first end of a microphone output path;

a first subtractor that is connected to a second end of the microphone output path and via a first end of a first useful-signal path to a useful-signal input, the useful-signal input configured to receive a useful signal to be reproduced by the loudspeaker;

an active noise reduction filter that is connected downstream of the first subtractor; and a second subtractor that is connected between the active noise reduction filter and the loudspeaker input path, the second subtractor further connected directly to the useful-signal input via a first end of a second useful-signal path; wherein a second end of the first useful-signal path and a second end of the second useful-signal path are connected with each other;

the second end of the second useful-signal path connected directly to the first end of the second useful-signal path;

the first useful-signal path comprises a low-pass filter configured to filter the useful signal upstream of the first subtractor, the low-pass filter comprising a transfer function that is an approximation of the secondary path between the loudspeaker and the microphone so that the useful-signal input at the microphone is roughly identical to the useful-signal output at the loudspeaker; and a filter input signal is supplied to the active noise reduction filter by the first subtractor.

2. The system of claim 1, in which the low-pass filter is a fixed filter and where the loudspeaker output is equal to the microphone input when no noise is detected by the microphone.

3. The system of claim 2, in which the low-pass filter has a cutoff frequency of 1 kHz or less.

4. The system of claim 1, in which the microphone is equipped with an acoustic filter.

5. The system of claim 4, in which the acoustic filter comprises a tube-forming duct, and in which the useful signal reaches the second subtractor without being filtered.

6. The system of claim 5, where the acoustic filter further comprises at least one Helmholtz resonator having an opening, and where an output of the second subtractor is connected only to the loudspeaker input path.

7. The system of claim 6, in which the opening is covered with a sound permeable membrane.

8. The system of claim 5, in which the tube-forming duct comprises at least one opening in a side wall of the tube-forming duct, the at least one opening forming part of a Helmholtz resonator.

9. The system of claim 8, in which the at least one opening is covered with a sound permeable membrane.

10. The system of claim 5, in which the tube-forming duct comprises at least one cross-section reducing taper.

11. The system of claim 5, in which the tube-forming duct is at least partially filled with sound absorbing material.

12. The system of claim 4, in which the acoustic filter has a cutoff frequency of 1 kHz or less.

13. The system of claim 1, wherein the useful signal is provided to each of the first useful-signal path and the second useful-signal path, wherein the useful signal propagates from a useful signal source to the first subtractor via the first useful-signal path without passing through the second subtractor, and wherein the useful signal propagates from the useful signal source to the second subtractor via the second useful-signal path without passing through the first subtractor.

14. A method of performing noise reducing sound reproduction comprising:

supplying an input signal to a loudspeaker by which the input signal is acoustically radiated;

receiving a signal radiated by the loudspeaker, the signal received by a microphone that is acoustically coupled to the loudspeaker via a secondary path, the microphone providing a microphone output signal;

subtracting the microphone output signal from a useful signal to generate a filter input signal;

filtering the filter input signal with an active noise reduction filter to generate an error signal;

directly receiving and subtracting the useful signal from the error signal to generate the loudspeaker input signal; and low-pass filtering the useful signal prior to subtraction from the microphone output signal, the low-pass filtering comprising a transfer function that is an approximation of the secondary path.

15. The method of claim 14, where low-pass filtering the useful signal comprises performing the low-pass filtering with a constant transfer characteristic of one or more low-pass filters.

16. The method of claim 14, where the low-pass filtering comprises low-pass filtering the useful signal with one or more low-pass filters, the one or more low-pass filters having a cutoff frequency of 1 kHz or less.

17. The method of claim 14, further comprising acoustically low-pass filtering the signal radiated by the loudspeaker to the microphone.

18. The method of claim 17, in which the acoustic low-pass filtering has a cutoff frequency of 1 kHz or less.

19. A noise reducing sound reproduction system comprising:

a first subtractor configured to receive an audio signal used to drive a loudspeaker to produce audible sound;

the first subtractor further configured to receive a microphone input signal, the microphone input signal comprising the audible sound received from the loudspeaker and, when noise reduction is not active, an undesired noise detected by a microphone in a listening space;

the first subtractor further configured to subtract the audio signal from the microphone input signal and generate a filter input signal;

an active noise reduction filter in communication with the first subtractor, the active noise reduction filter configured to generate an error signal based on the filter input signal;

a second subtractor in communication with the active noise reduction filter, the second subtractor configured to directly receive and subtract the audio signal from the error signal and output a loudspeaker input signal to drive the loudspeaker; and a low-pass filter in communication with the first subtractor, the low-pass filter configured to receive and filter the audio signal prior to receipt of the audio signal by the first subtractor, the low-pass filter comprising a transfer function that is an approximation of a secondary path.

20. The noise reducing sound reproduction system of claim 19, where the low-pass filter is an adaptive low-pass filter.

21. The noise reducing sound reproduction system of claim 19, further comprising an acoustic filter cooperatively operable with the microphone, the acoustic filter configured as a low-pass filter.

22. The noise reducing sound reproduction system of claim 21, where the low-pass filter comprises a first low-pass filter configured with a transfer characteristic that is an approximation of a physical path between the loudspeaker and the acoustic filter, and a second low-pass filter configured as an approximation of a transfer characteristic of the acoustic filter.

23. The noise reducing sound reproduction system of claim 21, where the low-pass filter comprises an analog filter, and the acoustic filter comprises a duct having a passageway through which audible sound travels to the microphone.

* * * * *